United States Patent
Ikeda

(10) Patent No.: US 12,067,116 B2
(45) Date of Patent: Aug. 20, 2024

(54) INFORMATION PROCESSING APPARATUS, INFORMATION PROCESSING METHOD, AND COMPUTER READABLE MEDIUM

(71) Applicant: NEC Corporation, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 453 days.

(21) Appl. No.: 17/433,313

(22) PCT Filed: Feb. 26, 2019

(86) PCT No.: PCT/JP2019/007229
§ 371 (c)(1),
(2) Date: Aug. 24, 2021

(87) PCT Pub. No.: WO2020/174565
PCT Pub. Date: Sep. 3, 2020

(65) Prior Publication Data
US 2022/0147630 A1     May 12, 2022

(51) Int. Cl.
*G06F 21/56* (2013.01)

(52) U.S. Cl.
CPC .......... *G06F 21/566* (2013.01); *G06F 21/567* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 10,289,837 B2* | 5/2019 | Uehara | ................ | G06F 21/552 |
| 10,303,873 B2* | 5/2019 | Aoki | ................ | G06F 21/554 |
| 2011/0307488 A1* | 12/2011 | Hirai | ................ | G06F 21/552 |
| | | | | 707/E17.061 |
| 2015/0161024 A1 | 6/2015 | Gupta et al. | | |
| 2017/0169024 A1* | 6/2017 | Glover | ................ | G06F 16/9535 |
| 2017/0250997 A1* | 8/2017 | Rostamabadi | ...... | H04L 63/1416 |
| 2018/0004939 A1 | 1/2018 | Kawakita | | |
| 2018/0046800 A1* | 2/2018 | Aoki | ................ | G06F 21/56 |

(Continued)

FOREIGN PATENT DOCUMENTS

| | | | | |
|---|---|---|---|---|
| EP | 3258409 A1 * | 12/2017 | ......... | G06F 11/3006 |
| JP | 2017-505935 A | 2/2017 | | |
| WO | WO-2015085265 A1 * | 6/2015 | ......... | G06F 11/3612 |

(Continued)

OTHER PUBLICATIONS

International Search Report for PCT Application No. PCT/JP2019/007229, mailed on Jun. 4, 2019.

*Primary Examiner* — Stephen T Gundry
*Assistant Examiner* — Hassan Saadoun

(57) ABSTRACT

An information processing apparatus according to the present disclosure includes an event index generation unit configured to generate an event index using event information output from a terminal and a search condition generation unit configured to generate a search condition for extracting the terminal exhibiting a specific behavior using a dynamic analysis result generated based on events occurred during an operation of malware and the event index. The search condition generation unit is configured to generate the search condition by reflecting an occurrence tendency of the event included in the dynamic analysis result in the terminal.

12 Claims, 19 Drawing Sheets

(56) References Cited

U.S. PATENT DOCUMENTS

2018/0063146 A1   3/2018   Nakata et al.

FOREIGN PATENT DOCUMENTS

| WO | 2016/121348 A1 | 8/2016 | |
|---|---|---|---|
| WO | 2016/132992 A1 | 8/2016 | |
| WO | 2016/147944 A1 | 9/2016 | |
| WO | WO-2016147944 A1 * | 9/2016 | .......... G06F 11/3006 |

* cited by examiner

EVENT INFORMATION OUTPUT FROM TERMINAL

| TIME | TERMINAL | PID | PROCESS | TYPE | ACCESS | OPERATION TARGET |
|---|---|---|---|---|---|---|
| T0 | C5 | 500 | /system/shell.exe | process | create | /system/browser.exe (pid=100) |
| T1 | C5 | 100 | /system/browser.exe | process | create | /tmp/suspicious.exe (pid=200) |
| T2 | C5 | 200 | /tmp/suspicious.exe | file | create | /appdata/V3/unknown.exe |
| T3 | C5 | 200 | /tmp/suspicious.exe | file | write | /appdata/V3/unknown.exe |
| T4 | C5 | 200 | /tmp/suspicious.exe | process | create | /appdata/V3/unknown.exe (pid=300) |
| T5 | C5 | 300 | /appdata/V3/unknown.exe | file | delete | /tmp/suspicious.exe |
| T6 | C5 | 100 | /system/browser.exe | file | read | /users/documents/normal.txt |
| ⋮ | | | | | | |

Fig. 3

PROCESS INDEX

| FOLDER | PROGRAM NAME | CLIENT |
|---|---|---|
| / | (any) | C1, C2, ... |
| /system/ | shell.exe | C1, C2, ... |
| /system/ | browser.exe | C1, C2, ... |
| /app/ | (any) | C1, C2, C3, C4, C5 |
| /app/V1/ | (any) | C1 |
| /app/V1/ | app1.exe | C1 |
| /app/V2/ | (any) | C1, C2, C3, C4, C5 |
| /app/V2/ | app2.exe | C1, C2 |
| /app/V2/ | app2_new.exe | C3, C4, C5 |
| /app/V3/ | (any) | C4, C5 |
| /app/V3/ | app3.exe | C4 |
| /appdata/ | (any) | C1, C2, ... |
| /appdata/V2/ | updater.exe | C1, C2, C3, C4, C5 |
| /appdata/V3/ | unknown.exe | C5 |
| /tmp/ | (any) | C5 |
| /tmp/ | suspicious.exe | C5 |
| ... | | |

Fig. 4

FILE INDEX A

| FOLDER | CLIENT |
|---|---|
| / | C1, C2, ... |
| /appdata/ | C1, C2, ... |
| /appdata/V1/ | C1 |
| /appdata/V1/app1 | C1 |
| /appdata/V2/ | C1, C2, C3, C4, C5 |
| /appdata/V3/ | C4, C5 |
| /appdata/V3/app3 | C4 |
| /user/ | C1, C2, C3, C4, C5 |
| /user/documents/ | C1, C2, C3, C4, C5 |
| ... | |

EXCLUDE

Fig. 5

FILE INDEX B

| FOLDER | DIRECTLY UNDER FOLDER | CLIENT |
|---|---|---|
| /appdata/ | False | C1, C2, ... |
| /appdata/ | True | C2 |
| /appdata/V1/ | False | C1 |
| /appdata/V1/ | True | C1 |

Fig. 6

PROCESS EVENT INDEX

| PROCESS | | CHILD PROCESS | | CLIENT |
|---|---|---|---|---|
| FOLDER | PROGRAM NAME | FOLDER | PROGRAM NAME | |
| /system/ | boot.exe | /system/ | shell.exe | C1, C2, ... |
| /system/ | shell.exe | /system/ | browser.exe | C1, C2, ... |
| /system/ | PROCESS | /app/V1/ | app1.exe | C1 |
| /system/ | shell.exe | /app/V2/ | app2.exe | C1, C2 |
| /system/ | shell.exe | /app/V2/ | app2_new.exe | C3, C4, C5 |
| /system/ | shell.exe | /app/V3/ | app3.exe | C4, C5 |
| /system/ | browser.exe | /tmp/ | suspicious.exe | C5 |
| /tmp/ | suspicious.exe | /appdata/V3/ | unknown.exe | C5 |
| ... | | | | |

Fig. 7

FILE EVENT INDEX

| PROCESS | | FILE PATH | | | CLIENT |
|---|---|---|---|---|---|
| FOLDER | PROGRAM NAME | ACCESS | FOLDER | EXTENSION | |
| /system/ | browser.exe | create | /tmp/ | exe | C5 |
| /system/ | browser.exe | create | /tmp/ | dat | C1, C2, ... |
| /system/ | brc PROCESS | delete | /tmp/ | dat | C1, C2, ... |
| /system/ | browser.exe | read | /user/documents/ | txt | C1, C2, ... |
| /app/V3/ | app3.exe | create | /appdata/V3/ | cfg | C4 |
| /tmp/ | suspicious.exe | write | /appdata/V3/ | cfg | C5 |
| /tmp/ | suspicious.exe | create | /appdata/V3/ | exe | C5 |
| ... | | | | | |

Fig. 8

DYNAMIC ANALYSIS RESULT

| TIME | PID | PROCESS | TYPE | ACCESS | OPERATION TARGET |
|---|---|---|---|---|---|
| T0 | P1 | /system/browser.exe | process | create | /tmp/sample.exe (pid=2) |
| T1 | P2 | /tmp/sample.exe | file | create | /appdata/XX/random.exe |
| T2 | P2 | /tmp/sample.exe | file | write | /appdata/XX/random.exe |
| T3 | P1 | /system/browser.exe | file | create | /tmp/settings.dat |
| T4 | P2 | /tmp/sample.exe | process | create | /appdata/XX/random.exe (pid=3) |
| T5 | P3 | /appdata/XX/random.exe | file | delete | /tmp/sample.exe |

Fig. 9

SEARCH CONDITION (PROCESS CONDITION)

| PROCESS CONDITION IDENTIFIER | EXECUTABLE FILE PATH |
|---|---|
| Q1 | dir:/system/, name:browser.exe |
| Q2 | dir:/tmp/ |
| Q3 | dir:/appdata/, minor:true |

Fig. 10

SEARCH CONDITION (EVENT CONDITION)

| PROCESS CONDITION IDENTIFIER | TYPE | ACCESS | OPERATION TARGET |
|---|---|---|---|
| Q1 | process | create | Q2 |
| Q1 | file | create | dir:/tmp/, ext:dat ← EXCLUDE |
| Q2 | file | create | dir:/appdata/, ext:exe, minor:true |
| Q2 | file | write | dir:/appdata/, ext:exe, minor:true |
| Q2 | process | create | Q3 |
| Q3 | file | delete | dir:/tmp/, ext:exe |

Fig. 11

SEARCH CONDITION (PROCESS CONDITION)

| PROCESS CONDITION IDENTIFIER (pcid) | EXECUTABLE FILE PATH |
|---|---|
| Q1 | dir:/tmp/ |
|  |  |

Fig. 14

SEARCH CONDITION (EVENT CONDITION)

| | PROCESS CONDITION IDENTIFIER (pcid) | EVENT (type) | ACCESS (mode) | OPERATION TARGET |
|---|---|---|---|---|
| EC1 | Q1 | file | create | dir:/appdata/, ext:exe, minor:true |
| EC2 | Q1 | file | create | dir:/tmp/, ext:dat |

Fig. 15

PROCESS INDEX

| FOLDER (program_dir) | PROGRAM NAME (program_name) | CLIENT |
|---|---|---|
| / | (any) | C1, C2, C3, C4, C5 |
| /tmp/ | (any) | C1, C2 |
| /tmp/ | setup.exe | C1, C2 |
| /tmp/ | malicious.exe | C1, C3 |
| ... | | |

Fig. 16

FILE INDEX

| FOLDER (dir) | CLIENT |
|---|---|
| / | C1, C2, C3, C4, C5 |
| /appdata/ | C1, C2, C3, C4, C5 |
| /appdata/V1/ | C1, C2, C3, C4, C5 | ← EXCLUDE
| /appdata/M1/ | C1, C2 |
| /appdata/M2/ | C1, C2 |
| /tmp/ | C1, C2, C3, C4, C5 |
| ... | |

Fig. 17

FILE EVENT INDEX

| PROCESS | | ACCESS (mode) | FILE PATH | | CLIENT | |
|---|---|---|---|---|---|---|
| FOLDER (program_dir) | PROGRAM NAME (program_name) | | FOLDER (dir) | EXTENSION (ext) | | |
| /tmp/ | setup.exe | create | /appdata/M1/ | exe | C1, C2 | FE1 |
| /tmp/ | setup.exe | create | /tmp/ | dat | C3, C4 | FE2 |
| /tmp/ | malicious.exe | create | /appdata/M2/ | exe | C1, C2 | FE3 |
| /tmp/ | malicious.exe | create | /tmp/ | dat | C1, C5 | FE4 |
| /tmp/ | temp.exe | create | /appdata/V1/ | exe | C3 | FE5 |
| ... | | | | | | |

Fig. 18

INFORMATION PROCESSING APPARATUS, INFORMATION PROCESSING METHOD, AND COMPUTER READABLE MEDIUM

This application is a National Stage Entry of PCT/JP2019/007229 filed on Feb. 26, 2019, the contents of all of which are incorporated herein by reference, in their entirety.

TECHNICAL FIELD

The present disclosure relates to an information processing apparatus, an information processing method, and a computer readable medium, and more particularly to an information processing apparatus, an information processing method, and a computer readable medium for generating a search condition for detecting a threat such as malware.

BACKGROUND ART

Recently, the importance of threat hunting for detecting malware and other threats which have already invaded organizations has been increasing. In particular, techniques to detect new or different types of malware that existing security devices have missed are becoming increasingly important.

Patent Literature 1 discloses a technique related to an anti-malware device capable of detecting malware with high accuracy. Patent Literature 2 discloses a technique related to a blacklist generating device for generating a blacklist by acquiring a malicious communication log and a normal communication log.

CITATION LIST

Patent Literature

Patent Literature 1: International Patent Publication No. WO2016/121348
Patent Literature 2: International Patent Publication No. WO2016/132992

SUMMARY OF INVENTION

Technical Problem

As a threat hunting technique, there is a technique for extracting a trace of malware (IoC: Indicators of Compromise) from a result of a dynamic analysis on the malware, and detecting the malware using this extracted trace information. In such a technique, search conditions are generated using the result of the dynamic analysis on the malware. The search conditions are used to detect an abnormal operation caused by the malware. The trace information of the malware includes a communication destination domain and a hash value of the malware, and a file path and a registry key created and/or changed by the malware.

However, since the communication destination domain and the hash value can be easily changed, when the search condition is generated using the communication destination domain or the hash value, malware may not be accurately detected. In addition, when a search condition requiring an exact match of the file path and the registry key is used, the target of detection is excessively limited, so that there has been a problem that malware cannot be detected accurately.

In light of the above problems, an object of the present disclosure is to provide an information processing apparatus, an information processing method, and a computer readable medium capable of generating a search condition for accurately detecting malware.

Solution to Problem

An example aspect of the present disclosure is an information processing apparatus including: an event index generation unit configured to generate an event index using event information output from a terminal; and a search condition generation unit configured to generate a search condition for extracting the terminal exhibiting a specific behavior using a dynamic analysis result generated based on events occured during an operation of malware and the event index. The search condition generation unit is configured to generate the search condition by reflecting an occurrence tendency of the event included in the dynamic analysis result in the terminal.

Another example aspect of the present disclosure is an information processing method including: generating an event index using event information output from a terminal; and generating a search condition for extracting the terminal exhibiting a specific behavior using a dynamic analysis result generated based on events occured during an operation of malware and the event index. When the search condition is generated, the search condition is generated by reflecting an occurrence tendency of the event included in the dynamic analysis result in the terminal.

Another example aspect of the present disclosure is a non-transitory computer readable medium storing a program for causing a computer to execute processing of: generating an event index using event information output from a terminal; and generating a search condition for extracting the terminal exhibiting a specific behavior using a dynamic analysis result generated based on events occured during an operation of malware and the event index. When the search condition is generated, the search condition is generated by reflecting an occurrence tendency of the event included in the dynamic analysis result in the terminal.

Advantageous Effects of Invention

According to the present disclosure, it is possible to provide an information processing apparatus, an information processing method, and a computer readable medium capable of generating a search condition for accurately detecting malware.

BRIEF DESCRIPTION OF DRAWINGS

FIG. 3 is a table showing an example of event information output from a terminal;

FIG. 4 is a table showing an example of an event index (process index) generated using the event information output from the terminal;

FIG. 5 is a table showing an example of the event index (file index) generated using the event information output from the terminal;

FIG. 6 is a table showing an example of the event index (file index) generated using the event information output from the terminal;

FIG. 7 is a table showing an example of the event index (process event index) generated using the event information output from the terminal;

FIG. 8 is a table showing an example of the event index (file event index) generated using the event information output from the terminal;

FIG. 9 is a table showing an example of dynamic analysis results;

FIG. 10 is a table showing an example of search conditions (process conditions);

FIG. 11 is a table showing an example of the search conditions (event conditions);

FIG. 14 is a table showing an example of the search conditions (process conditions);

FIG. 15 is a table showing an example of the search conditions (event conditions);

FIG. 16 is a table showing an example of an event index (process index);

FIG. 17 is a table showing an example of the event index (file index);

FIG. 18 is a table showing an example of the event index (file event index)

DESCRIPTION OF EMBODIMENTS

Outline of the Present Disclosure

Figure 1:
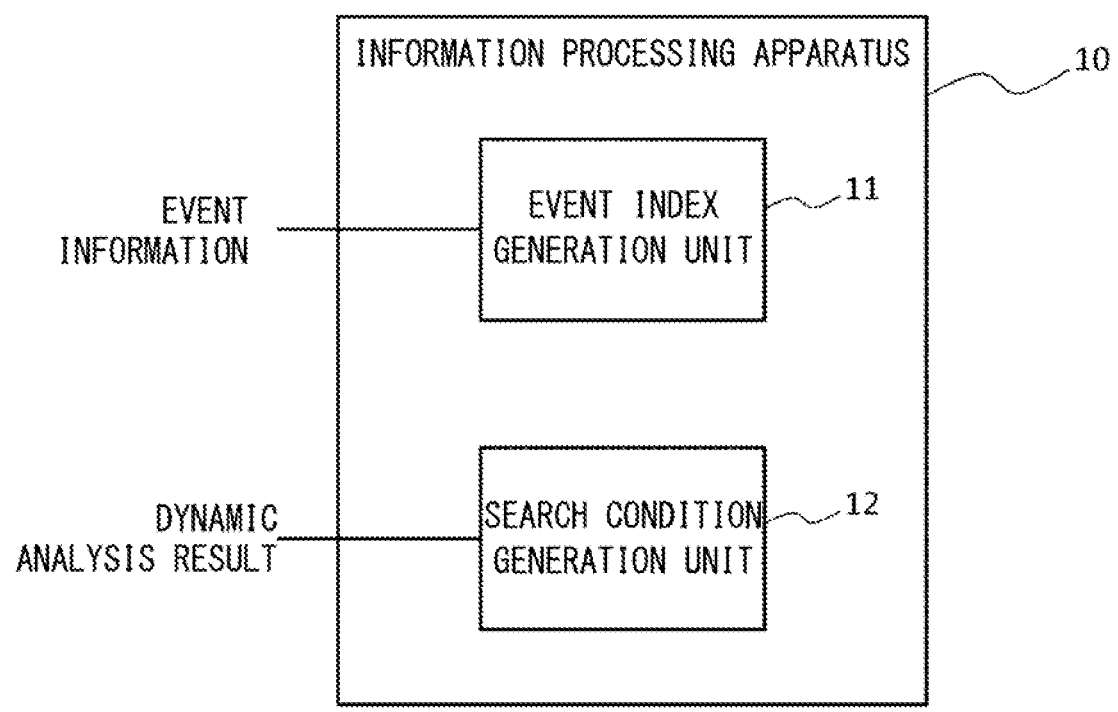
FIG. 1 is a block diagram for explaining an information processing apparatus according to an example embodiment of the present disclosure.

Example embodiments of the present disclosure will be described below. FIG. 1 is a block diagram for explaining an information processing apparatus according to this example embodiment, and is a diagram for explaining an outline of the present disclosure. As shown in FIG. 1, an information processing apparatus 10 according to this example embodiment includes an event index generation unit 11 and a search condition generation unit 12.

The event index generation unit 11 generates an event index using event information output from a terminal. The search condition generation unit 12 generates a search condition for extracting the terminal exhibiting a specific behavior using a dynamic analysis result generated based on events occured during an operation of malware and an event index generated by the event index generation unit 11. At this time, the search condition generation unit 12 generates the search condition by reflecting an occurrence tendency of the event included in the dynamic analysis result in the terminal.

As described above, the information processing apparatus 10 according to this example embodiment generates the search condition by reflecting the occurrence tendency of the event, which is included in the dynamic analysis result, in the terminal. It is thus possible to generate the search condition for accurately detecting the malware operating in the terminal. Hereinafter, the present disclosure will be described in detail.

Configuration of Information Processing Apparatus

Figure 2:
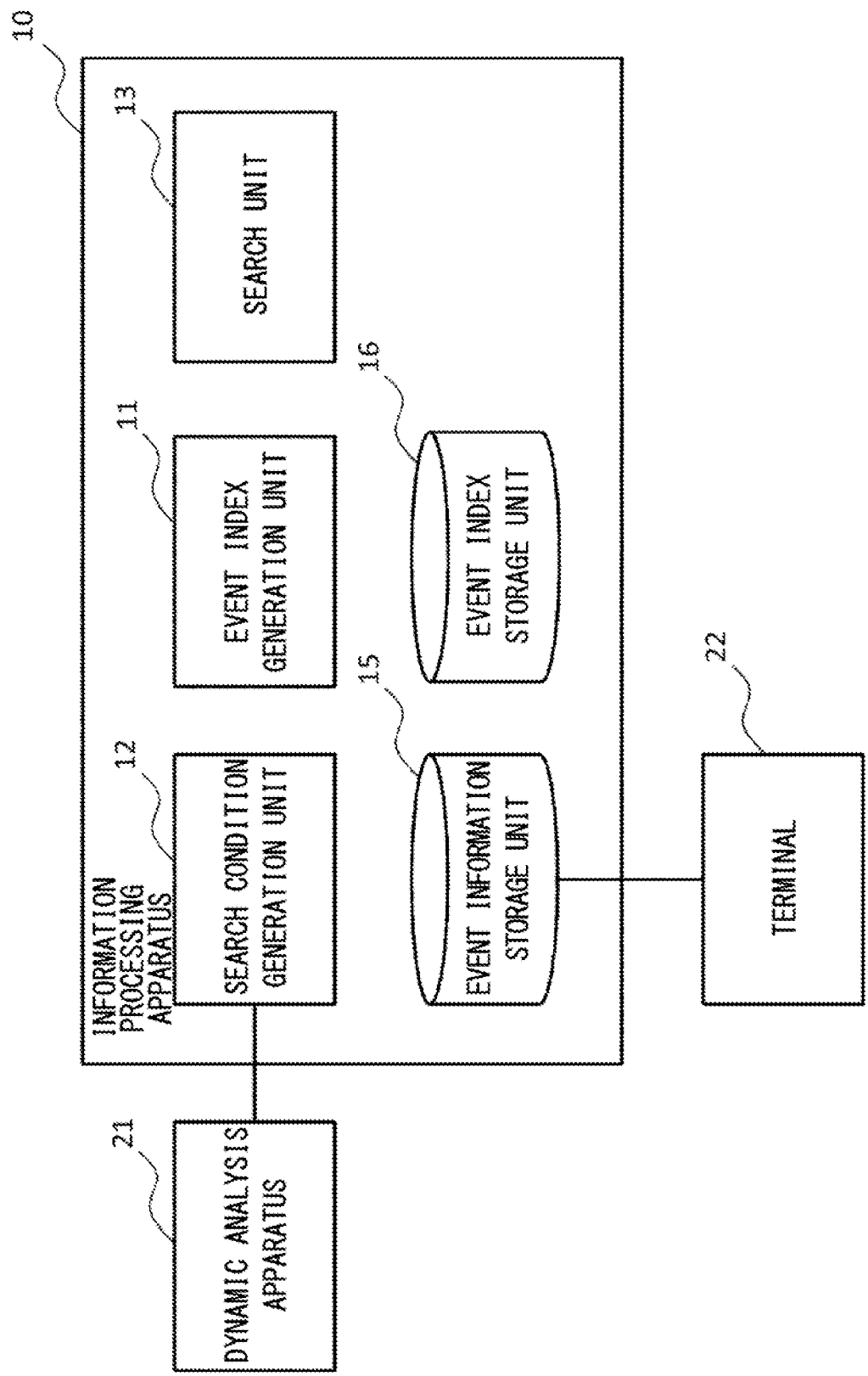
FIG. 2 is a block diagram for explaining a specific configuration of an information processing apparatus according to the example embodiment.

FIG. 2 is a block diagram for explaining a specific configuration of the information processing apparatus according to this example embodiment. As shown in FIG. 2, the information processing apparatus 10 according to this example embodiment includes the event index generation unit 11, the search condition generation unit 12, a search unit 13, an event information storage unit 15, and an event index storage unit 16. The information processing apparatus 10 is connected to a dynamic analysis apparatus 21 and a terminal 22.

The dynamic analysis apparatus 21 analyzes an operation of malware using a malware sample. Specifically, the dynamic analysis apparatus 21 generates a dynamic analysis result based on events occurred during the operation of the malware. The dynamic analysis result generated by the dynamic analysis apparatus 21 is supplied to the search condition generation unit 12.

The terminal 22 is a target of threat hunting (i.e., a target for which malware is inspected). A plurality of the terminals 22 may be used. For example, the terminal 22 is a plurality of computers connected to a network.

The event index generation unit 11 generates an event index using the event information output from the terminal 22. Specifically, the event information output from the terminal 22 is stored in the event information storage unit 15. The event index generation unit 11 generates the event index using the event information stored in the event information storage unit 15. The event index generated by the event index generation unit 11 is stored in the event index storage unit 16.

For example, the event information is supplied from the terminal 22 as needed and stored in the event information storage unit 15. In other words, the event information stored in the event information storage unit 15 is updated as needed. The event index generation unit 11 updates the event index as needed using the event information stored in the event information storage unit 15. The event index is generated using an event occurred in the terminal 22, and is an index in which the occurred event (object) is associated with the terminal 22. In this example embodiment, each event information is abstracted when the event index is generated. The occurrence terminal 22 is recorded for each level of abstraction. An example of the event index will be described later.

The search condition generation unit 12 generates the search condition for extracting the terminal exhibiting a specific behavior using the dynamic analysis result of the malware generated by the dynamic analysis apparatus 21 and the event index generated by the event index generation unit 11. At this time, the search condition generation unit 12 generates the search condition by reflecting the occurrence tendency of the event, which is included in the dynamic analysis result, in the terminal 22.

For example, the search condition is configured using at least one of an event condition and a process condition. The event condition is related to at least one of process creation, thread creation, file access, registry access, dynamic library reading, and communication, while the process condition is related to an occurred process.

The search unit 13 searches the terminal matching the search condition generated by the search condition generation unit 12.

Operation of Information Processing Apparatus

Next, an operation of the information processing apparatus according to this example embodiment will be described using a specific example.

Event Information of Terminal

FIG. 3 is a table showing an example of the event information output from the terminal 22. As shown in FIG. 3, the event information includes a time, a terminal, a PID (process ID), a process, a type, an access, and an operation target.

For example, the event information in the first row indicates an event related to a process having PID=500, which occurred in a terminal C5 at the time T0, which is a behavior of an executable file "shell.exe" stored in "/system/". The type of this event is "process", the access is "create", and the operation target is "/system/browser.exe (pid=100)". That is, the event information of the first row means that the process indicated by PID=500 creates (executes) a child process having PID=100, and the executable file (the operation target) of the child process is "browser.exe" stored in "/system/". The other event information is interpreted in a manner similar to the event information in the first row. For example, the event information in the fourth row indicates an event related to a process having PID=200, which occurred in the terminal C5 at the time T3, which is a behavior of an executable file "suspicious.exe" stored in "/tmp/". The type of this event is "file", the access is "write", and the operation target is "/appdata/V3/unknown.exe".

Generation of Event Index

The event index generation unit 11 generates the event index using the event information (see FIG. 3) output from the terminal 22. FIGS. 4 to 8 are tables showing examples of the event index generated using the event information output from the terminal 22. FIG. 4 shows an example of a process index. FIGS. 5 and 6 show examples of file indexes. FIG. 7 shows an example of a process event index. FIG. 8 shows an example of a file event index.

As shown in FIG. 4, the event index (process index) includes folders, program names, and clients (terminals). The event index (the process index) includes an index in which the event information is abstracted, and the clients (the terminals) is recorded for each level of abstraction. In FIG. 4, abstraction of the event index is indicated by arrows. The same applies to the other drawings.

For example, in the sixth row of the table of FIG. 4, a program "appl.exe" in the folder "app/V1/" is abstracted to generate an event index (folder "/app/V1/", program "any") in the fifth row. Here, the program "any" indicates any program. A program "app2.exe" in a folder "/app/V2/" in the eighth row is abstracted to generate an event index (folder "/app/V2/", program "any") in the seventh row. Similarly, a program "app2_new.exe" in the folder "/app/V2/" in the ninth row is abstracted to generate an event index (folder "/app/V2/", program "any") in the seventh row. The abstracted event index (folder "/app/V2/", program "any") in the seventh row includes "C1, C2, C3, C4, C5" as the clients (the terminals), which corresponds to a combination of the clients "C1, C2" in the eighth row and the clients "C3, C4, C5" in the ninth row.

An event index (folder "/app/", program "any", client "C1, C2, C3, C4, C5") in the fourth row of the table in FIG. 4 is obtained by abstracting the event index in the fifth to eleventh rows. That is, the hierarchy of the folders "/app/V1/", "/app/V2/", and "/app/V3/" is raised one level to "/app/", and the program is set to "any". Thus, in the present disclosure, the term "abstraction" means expanding the scope of the event index.

Next, an example of the event index (the file index) shown in FIGS. 5 and 6 will be described. As shown in FIG. 5, the event index (the file index) includes folders and clients (the terminals). The event index (the file index) includes an index in which the event information is abstracted, and the client (the terminal) is recorded for each level of abstraction. The abstraction is the same as that described with reference to FIG. 4. Also in FIG. 5, the abstraction of the event index is indicated by arrows.

In the case of the event index (the file index), a table (FIG. 6) which enables a determination about whether or not a file directly under the folder is accessed may be created. For example, in the table shown in FIG. 6, when the item directly under the folder "/appdata/" is "False", it indicates that the access is not to a file directly under the folder. In this case, the clients are "C1, C2, . . . ". When the item directly under the folder "/appdata/" is "True", it indicates that the access is to a file directly under the folder. In this case, the client is "C2". That is, in this case, the client accessing the file directly under the folder "/appdata/" is "C2".

Next, an example of the event index (a process event index) shown in FIG. 7 will be described. As shown in FIG. 7, the event index (the process event index) includes processes, child processes, and clients (terminals). Each process and child process include a folder and a program name.

For example, the first row of the table in FIG. 7 indicates that a child process of a program "boot.exe" in the folder "/system/" is the program "shell.exe" in the folder "/system/". This indicates that the program "boot.exe" is executing the program "shell.exe" of the child process. Similarly, the second row of the table in FIG. 7 indicates that the child process of the program "shell.exe" in the folder "/system/" is the program "browser.exe" in the folder "/system/". This indicates that the program "shell.exe" is executing the program "browser.exe" of the child process.

Next, an example of the event index (the file event index) shown in FIG. 8 will be described. As shown in FIG. 8, the event index (the file event index) includes processes, accesses, file paths, and clients (terminals). The process includes a folder and a program name. The file path also includes a folder and an extension.

For example, the first row of the table in FIG. 8 indicates that the access of the program "browser.exe" in the folder "/system/" is "create", the folder of the file path is "/tmp/", the file extension is "exe", and the client is "C5". The other rows are interpreted in a manner similar to the first row of the table in FIG. 8. In the event index (the file event index) shown in FIG. 8, the name of the file stored in the folder of the file path is abstracted to the extension level.

The event index generation unit 11 can generate the event index described above using the event information output from the terminal 22. The event indexes shown in FIGS. 4 to 8 are examples, and the event index generation unit 11 may generate other event indexes.

Dynamic Analysis Result

FIG. 9 is a table showing an example of the dynamic analysis result generated by the dynamic analysis apparatus 21, and is a table showing an example of the dynamic analysis results generated based on the events occurred during the operation of malware. As shown in FIG. 9, the dynamic analysis result includes a time, a PID (a process ID), a process, a type, an access, and an operation target. For example, the dynamic analysis result in the first row indicates a process having PID=P1 which occurred at the time T0, which is a behavior of the executable file "browser.exe"

stored in "/system/". The type of the event is "process", the access is "create", and the operation target is "/tmp/sample.exe (pid=2)". That is, the dynamic analysis result in the first row shows that the process indicated by PID=P1 creates (executes) a child process having PID=P2, and the executable file (operation target) of the child process is "sample.exe" stored in "/tmp/".

Generation of Search Condition

Next, generation of the search condition will be described. The search condition generation unit 12 generates the search condition for extracting the terminal exhibiting the specific behavior using the dynamic analysis result and the event index. At this time, the search condition generation unit 12 generates the search condition by reflecting the occurrence tendency of the event, which is included in the dynamic analysis result, in the terminal 22.

The search condition generation unit 12 may generate the search condition by reflecting a process behavior of the event, which is included in the dynamic analysis result, in the terminal 22.

Further, the search condition generation unit 12 may determine whether or not a target event is a rare event based on the event index. When the target event is the rare event, the search condition may be generated in such a way that a search range becomes wider than the search range corresponding to the rare event (i.e., the search range is abstracted). When the target event is the rare event, the search condition generation unit 12 may add a rare flag indicating that the target event is the rare event to the search condition. Here, the rare event is an event having a small number of occurrences, for example, an event having a small number of terminals in which the target event occurs. Parameters (e.g., the number of terminals) for defining the rare event can be freely determined by the user.

When the target event is the rare event, the search condition generation unit 12 may expand the search range using a file path higher than the file path of the executable file of the rare event (i.e., the search range may be abstracted).

Further, the search condition generation unit 12 determines whether or not the target event is a frequent event based on the event index. If the target event is the frequent event, the search condition is generated excluding the search condition corresponding to the frequent event. Here, the frequent event is an event having a large number of occurrences, for example, an event having a large number of terminals in which the target event occurs. Parameters (e.g., the number of terminals) for defining the frequent event can be freely determined by the user.

Specific examples of the search condition will be described below. FIG. 10 is a table showing an example of the search conditions (process conditions). FIG. 11 is a table showing an example of the search conditions (event conditions).

In this specification, data is expressed in the form of {a:1, b:2}, and this description indicates that values of fields a and b are 1 and 2, respectively. A list structure is expressed in the form of [a, b, c], and in this case, a list including three elements of a, b, and c is expressed. Further, a pair is expressed by <a, b>, and in this case, a pair composed of a and b is expressed.

The search condition (the process condition) shown in FIG. 10 shows an example of extracting the process condition from occurred processes, and includes a process condition identifier and an executable file path. For example, the process condition identifier of the search condition in the first row is "Q1", and the executable file path is {dir:/system/, name:browser.exe}. This search condition is generated based on PID=P1 of the dynamic analysis result of FIG. 9 and the first to fourth rows of the event index of FIG. 8.

The process condition identifier of the search condition in the second row in FIG. 10 is "Q2", and the executable file path is {dir:/tmp/}. This search condition is generated based on PID=P2 of the dynamic analysis result of FIG. 9.

The process condition identifier of the search condition in the third row in FIG. 10 is "Q3", and the executable file path is {dir:/appdata/, minor:true}. Note that "minor:true" corresponds to the above-mentioned "rare flag".

The search condition (the event condition) shown in FIG. 11 shows an example of extracting the event condition from other events (i.e., events other than the occurred processes), and includes a process condition identifier, an event, an access, and an operation target. The process condition identifier in the search condition (the event condition) shown in FIG. 11 is for identifying an entry of the process condition shown in FIG. 10.

For example, the process condition identifier of the search condition in the first row is "Q1", the type is "process", the access is "create", and the operation target is "Q2". This means that the process "Q1" generated the process "Q2". The process of the search condition in the second row is "Q1", the type is "file", the access is "create", and the operation target is {dir:/tmp/, ext:dat}. This search condition is excluded from the search condition, because it corresponds to the frequent event. That is, if the target event occurs in many terminals, the event condition for the target event is not extracted. Specifically, in the second to third rows of the event index in FIG. 8, since a file creation event corresponding to {dir:/tmp/, ext:dat} by the process "/system/browser.exe" occurs in many clients, this event is excluded from the search condition.

The process of the search condition in the third row of FIG. 11 is "Q2", the type is "file", the access is "create", and the operation target is {dir:/appdata/, ext:exe, minor:true}. Note that "minor:true" corresponds to the above-mentioned "rare flag". The process of the search condition in the sixth row is "Q3", the type is "file", the access is "delete", and the operation target is {dir:/tmp/, ext:exe}.

The search condition generation unit 12 can generate the search condition described above using the dynamic analysis result and the event index. Note that the search conditions shown in FIGS. 10 and 11 are examples, and the search condition generation unit 12 may generate the search conditions other than those shown in FIGS. 10 and 11.

Operation of Search Unit

Next, an operation of the search unit 13 shown in FIG. 2 will be described. The search unit 13 searches the terminal matching the search condition generated by the search condition generation unit 12. That is, the search unit 13 extracts the terminal exhibiting a specific behavior (i.e., the terminal in which malware may be operating).

The search condition used for the search by the search unit 13 includes the rare flag indicating whether or not the event is the rare event. When the rare flag is true, the search unit 13 extracts terminals included in the event index in which the number of occurrence terminals is smaller than a predetermined threshold from the event index in which the degree of abstraction is lower than that of the search condition.

When the rare flag is true, the search unit 13 may determine a folder whose hierarchy is deeper than that of the search condition and in which the number of occurrence terminals is a predetermined threshold or more as a folder to be excluded, and exclude the folder to be excluded from the folders included in the event index.

For example, in the event index (the file index) shown in FIG. 5, when "dir:/appdata/, minor:true" is used as the condition, an entry in which the folder starts with "/appdata/", the hierarchy is one step deeper (/appdata/V1/, /appdata/V2/, . . . ), and the number of clients is a threshold or more may be included in an exclusion list. In the event index (the file index) shown in FIG. 5, when the threshold is 5, "/appdata/V2/" in which the number of clients is 5 or more is excluded. In the following description, the threshold of the number of clients for the rare flag is set to 5.

Figure 12:
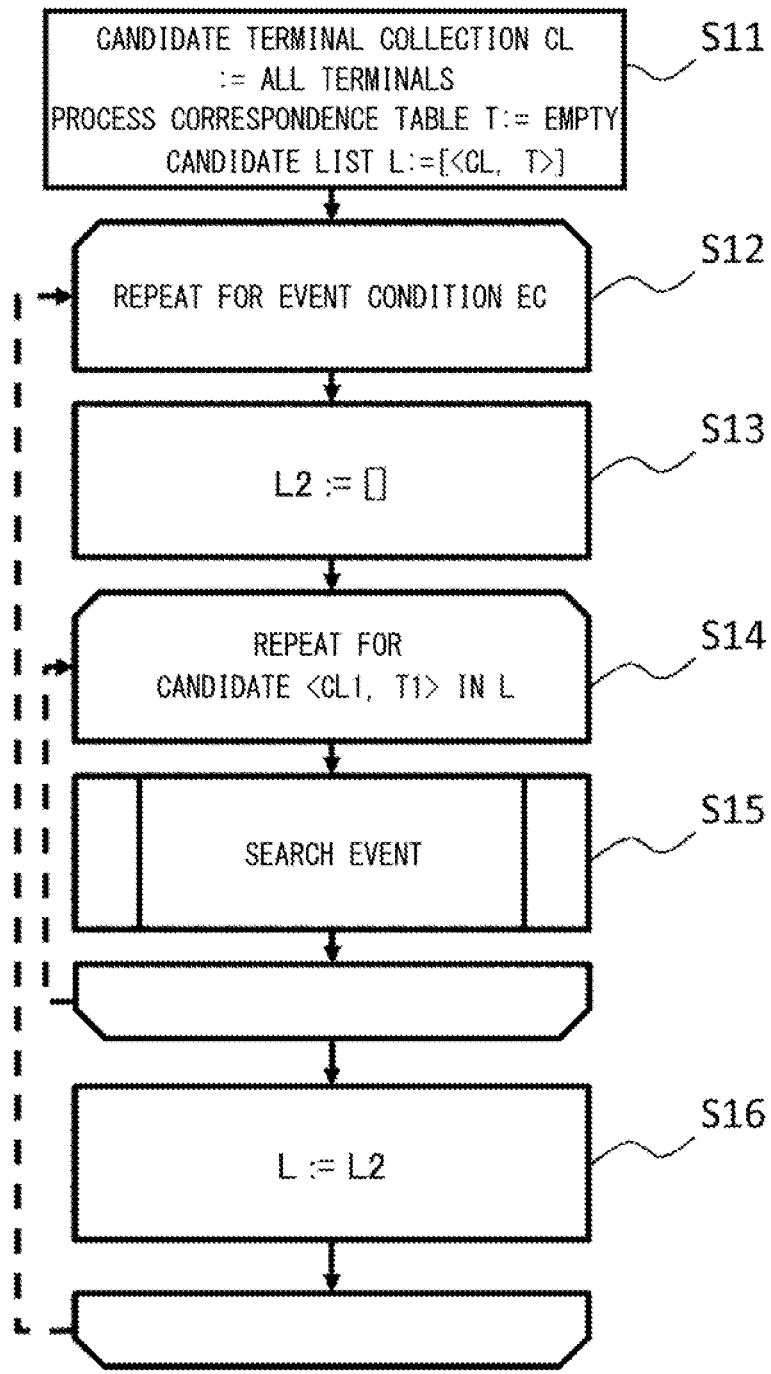
FIG. 12 is a flowchart for explaining an operation of searching for a terminal that matches the search condition.
Figure 13:
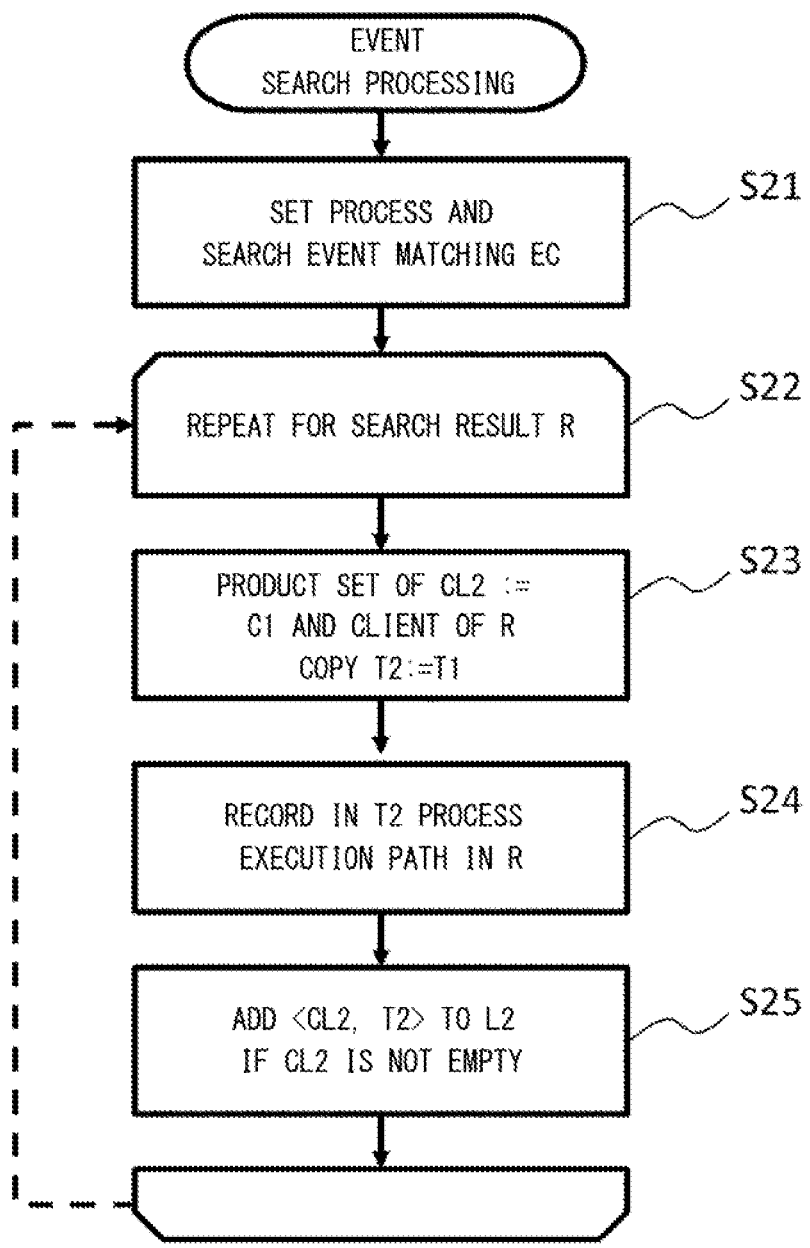
FIG. 13 is a flowchart for explaining the operation (event search processing) of Step S15 of the flowchart shown in FIG. 12.

The operation of the search unit 13 will be described below with a specific example. FIGS. 12 and 13 are flowcharts for explaining the operation of the search unit 13. FIG. 12 is a flowchart for explaining the operation of searching for a terminal matching the search condition. FIG. 13 is a flowchart for explaining the operation (event search processing) of Step S15 of the flowchart shown in FIG. 12.

The operation of the search unit 13 when the conditions shown in the tables of FIGS. 14 to 18 are used will be described below for the purpose of simplifying the explanation. FIG. 14 is a table showing an example of the search conditions (the process conditions). FIG. 15 is a table showing an example of the search conditions (the event conditions). FIG. 16 is a table showing an example of the event index (the process index). FIG. 17 is a table showing an example of the event index (the file index). FIG. 18 is a table showing an example of the event index (the file event index).

The search unit 13 first executes the operation of Step S11 of FIG. 12. That is, a candidate terminal collection CL includes all terminals (C1, C2, C3, C4, C5), a process correspondence table T is emptied, and the candidate list L is initialized. The process correspondence table T holds correspondences between the process condition identifiers and the determined executable file paths. The initialized candidate list La is La=[<CLa, Ta>], and CLa=[C1, C2, C3, C4, C5] (all terminals), and Ta=[ ].

Next, the processing of Steps S13 to S15 is repeated for all the event conditions EC (Step S12). Here, in the example of the event condition of FIG. 15, the processing is performed in order from the first row, and the processing is first performed for EC=EC1. In the processing for the event condition, first, the next candidate list L2 holding an intermediate result is initialized to an empty list (Step S13). After that, the event search processing (Step S15) is repeated for the candidate <CL1, T1> in the candidate list L (Step S14). That is, the event search processing is performed for <CLa, Ta> (repetition for elements of La).

FIG. 13 is a flowchart for explaining the event search processing. When the event search processing is performed, first, the process is set and the event matching EC is searched (Step S21). Specifically, when Ta includes the executable file path of the process, this information is set as the process condition. On the other hand, when Ta does not include the executable file path of the process, the process condition is set as the search condition. If the event type is process, the same setting is configured for the child process.

At present, since the process corresponding to the process condition identifier Q1 is not yet held in Ta, the process condition corresponding to the process condition identifier Q1 is searched as the search condition (EC1 in FIG. 15).

Specifically, an item corresponding to {program dir:/tmp/, type:file, mode:create, dir:/appdata/, ext:exe, minor:true} is searched in the file event index (see FIG. 18). As a result, a search result Ra:=[FE1, FE3] is extracted. Field names such as "program_dir" are described in parentheses in each table. In this example embodiment, the field name may be appropriately converted into a corresponding field name in accordance with the index to be searched. Specifically, {dir:D, name:N} of the process condition may be converted into {program_dir:D, program_name:N} in accordance with the file event index.

Since "minor:true" is specified in the search condition EC1 (see FIG. 15) and "/appdata/V1/" is included in the exclusion list (see FIG. 17), FES shown in FIG. 18 is not included in the search result. That is, in the file index shown in FIG. 17, entries in which the folder starts with "/appdata/", the hierarchy is one step deeper (/appdata/V1/,/appdata/M1/,/appdata/M2/), and the number of clients is the threshold or more are included in the exclusion list. In the file index shown in FIG. 15, "/appdata/V1" in which the number of clients is 5 or more is excluded.

Next, the processing of Steps S23 to S25 is repeated for a search result R (Step S22). Specifically, the processing of Steps S23 to S25 is repeated for FE1 extracted in the result Ra. First, in Step S23, a product set of CLa and [C1, C2] is obtained. Thus, CL2=[C1, C2] and T2=[ ]. After that, in Step S24, the executable file path of the process in the search result R is recorded in T2. At present, since the executable file path of the process corresponding to the process condition identifier Q1 is not held in T2, the information of FE1 is recorded in T2. Therefore, T2=[{pcid:Q1, program_dir:/tmp/, program_name:setup.exe}].

Next, since CL2 is not empty, <CL2, T2>, that is, <CLb, Tb> is added to L2 (Step S25). Here, CLb=[C1, C2], Tb=[{pcid:Q1, program dir:/tmp/, program_name:setup.exe}]. If CL2 is empty, it indicates that there is no terminal in which all events have occurred for T2 of interest.

Next, as in the case of FE1, the processing of Steps S23 to S25 is repeated for FE3. First, in Step S23, a product set of CLa and [C1, C2] is obtained. Thus, CL2=[C1, C2] and T2=[ ]. After that, in Step S24, the executable file path of the process in the search result R is recorded in T2. Also in this case, since the executable file path of the process corresponding to the process condition identifier Q1 is not held in T2, the information of FE3 is recorded in T2. Therefore, T2=[{pcid:Q1, program dir:/tmp/, program_name:malicious.exe}].

Next, since CL2 is not empty, <CL2, T2>, that is, <CLc, Tc> is added to L2 (Step S25). As a result, L2=[<CLb, Tb>, <CLc, Tc>] including the previous information. Here, CLc=[C1, C2] and Tc=[{pcid:Q1, program_dir:/tmp/, program_name:malicious.exe}].

As a result of the above processing, the repetitive processing (Step S22) for the search result Ra is completed. Further, the repetitive processing for the candidate list La (Step S14 in FIG. 12) is completed. After that, in Step S16, the candidate list L is updated. Thus, L=[<CLb, Tb>, <CLc, Tc>]. In the following description, Lb=[<CLb, Tb>, <CLc, Tc>] for convenience of explanation.

Next, the process returns to Step S12, and the processing of Steps S13 to S15 is repeated for EC2 (see FIG. 15). First, L2 is initialized to L2=[ ] (Step S13). After that, the event search processing (Step S15) is repeated for the candidate <CLb, Tb>in Lb (Step S14).

Specifically, since the condition corresponding to the process condition identifier Q1 of EC2 is held in Tb, the search condition is set based on this condition and the search is performed (Step S21 in FIG. 13). Specifically, an item corresponding to {program_dir:/tmp/, program_name:setup.exe, type:file, mode:create, dir:/tmp/, ext:dat} is searched in the file event index. As a result, Rb=[FE2] is extracted as the search result.

Next, the processing of Steps S23 to S25 is repeated for the search result R (Step S22). Specifically, the processing in Steps S23 to S25 is repeated for FE2 extracted in a search result Rb. First, in Step S23, a product set of CLb and [C3, C4] is obtained. Thus, CL2=[ ] and T2=[{pcid:Q1, program_dir:/tmp/, program_name:setup.exe}]. Here, since the correspondence of Q1 has been recorded, there is no change in T2. Since CL2 is empty, there is no addition to L2 (Step S25). By these processes, the process for the search result Rb is completed.

Next, the process returns to Step S14 in FIG. 12, and the event search processing <CLc, Tc>is repeated for the candidate in Lb (Step S15).

Specifically, since the condition corresponding to the process condition identifier Q1 of EC2 is held in Tc, the search condition is set based on this condition and the search is performed (Step S21 in FIG. 13). Specifically, an item corresponding to {program_dir:/tmp/, program name:malicious.exe, type:file, mode:create, dir:/tmp/, ext:dat} is searched in the file event index. As a result, Rc=[FE4] is extracted as the search result.

Next, the processing of Steps S23 to S25 is repeated for the search result R (Step S22). Specifically, the processing of Steps S23 to S25 is repeated for FE4 extracted in the search result Rc. First, in Step S23, a product set of CLc and [C1, C4] is obtained. Thus, CL2=[C1] and T2=[{pcid:Q1, program_dir:/tmp/, program name:malicious.exe}]. Here, since the correspondence of Q1 has been recorded, there is no change in T2. Since CL2 is not empty, <CLd, Td>is added to L2 (Step S25). Here, CLd=[C1].

As a result of the above processing, the repetitive processing (Step S22) for the search result Rc is completed. Further, the repetitive processing (Step S14) for the candidate list Lb is completed. After that, in Step S16, the candidate list L is updated. Thus, L=[<CLd, Td>]. By these processes, the repetitive processing in Step S12 is completed.

As a result of the above processing in the search unit 13, the search result is finally stored in the candidate list L. In the above example, CLd (=[C1]) is a client list that matches the search condition, and Td holds information about processes that match the condition. Here, Td=[{pcid:Q1, program_dir:/tmp/, program_name:malicious.exe}]. When there are a plurality of correspondences of processes matching the search condition, a client list CL is extracted for each process correspondence. For example, in FIG. 18, when the client of FE2 is [C1, C2], the final result is L=[<[C1,C2], Tb>, <[C1], Tc>1].

By the operation of the search unit 13 described above, a terminal (i.e., a terminal in which malware may be operating) exhibiting a specific behavior can be extracted.

As described above, as a technique for threat hunting, there is a technique for extracting a trace of malware (IoC) from a result of a dynamic analysis on the malware and detecting the malware using this extracted trace information. In such a technique, search conditions are generated using the result of the dynamic analysis on the malware. The search conditions are used to detect an abnormal operation caused by the malware. The trace information of the malware includes a communication destination domain and a hash value of the malware, and a file path and a registry key created and/or changed by the malware.

However, since the communication destination domain and the hash value can be easily changed, when the search condition is generated using the communication destination domain or the hash value, malware may not be accurately detected. In addition, when a search condition requiring an exact match of the file path and the registry key is used, the target of detection is excessively limited, so that there has been a problem that malware cannot be detected accurately.

In contrast, in this example embodiment, the event index is generated using the event information output from the terminal. Further, the search condition for extracting the terminal exhibiting the specific behavior is generated using the dynamic analysis result generated based on the events occuring during the operation of the malware and the event index. Further, the search condition is generated by reflecting the occurrence tendency of the event, which is included in the dynamic analysis result, in the terminal.

As described above, in this example embodiment, the search condition is generated by reflecting the occurrence tendency of the event, which is included in the dynamic analysis result, in the terminal. By doing so, the search condition for detecting the malware accurately can be generated.

In particular, in this example embodiment, when the target event is the rare event, the search condition is generated in such a way that the search range becomes wider than the search range corresponding to the rare event (i.e., the search range is abstracted). For example, when the target event is the rare event, the search range is widened by setting the file path higher than the file path of the executable file of the rare event. Therefore, it is possible to achieve the search in consideration of changes in behavior due to variants, etc. It is also possible to prevent or minimize an excessive increase in the number of extracted items due to the abstraction.

In this example embodiment, when the target event is the frequent event, the search conditions are generated excluding the search condition corresponding to the frequent event. Thus, by excluding the search conditions corresponding to the frequent events, that is, by not generating the search conditions corresponding to a normal operation, the search conditions can be simplified.

In the above-described example embodiment, the event information and the search condition regarding the file are described. However, in this example embodiment, event indexes and search conditions may be generated for events related to registry and communication in addition to files in the same manner as files.

In the above example embodiment, the case where only the terminal is managed as a transposed index has been described with respect to the structure of the event index. However, in this example embodiment, the event index may be configured to include <terminal, time information>, so that it becomes possible to search when an event has occurred.

In this example embodiment, the search conditions generated by the search condition generation unit 12 may be associated with the dynamic analysis results generated by the dynamic analysis apparatus 21 and then the association may be visualized. That is, by visualizing which events have been converted (or discarded) into which conditions in association with each other, the user can easily confirm the validity of the search conditions. For example, a search condition list and a dynamic analysis result list may be displayed side by side on a display, and the search condition generated by the search condition generation unit 12 and the dynamic analysis result corresponding to the search condition may be displayed in the same color. Alternatively, for example, the same symbols may be attached to the search conditions generated by the search condition generation unit 12 and the dynamic analysis results corresponding to the search conditions.

Further, in this example embodiment, the search may be performed in the order of the search conditions in which the number of occurrence terminals is small. For example, the number of hits may be cached and used when the search condition is generated and when the search is performed. By doing so, when there is no terminal matching the search condition, the search can be made efficient.

In the above example embodiments, the present disclosure has been described as a hardware configuration, but the present disclosure is not limited to this. The information processing described above can also be implemented by causing a CPU (Central Processing Unit),which is a processor, to execute a computer program.

More specifically, the event index is generated using the event information output from the terminal, and the search condition for extracting the terminal exhibiting the specific behavior is generated using the dynamic analysis result and the event index generated based on the events occurred during the operation of the malware. Further, the search condition is generated by reflecting the occurrence tendency of the event, which is included in the dynamic analysis result, in the terminal. A program for executing such processing may be executed by a computer.

Figure 19:
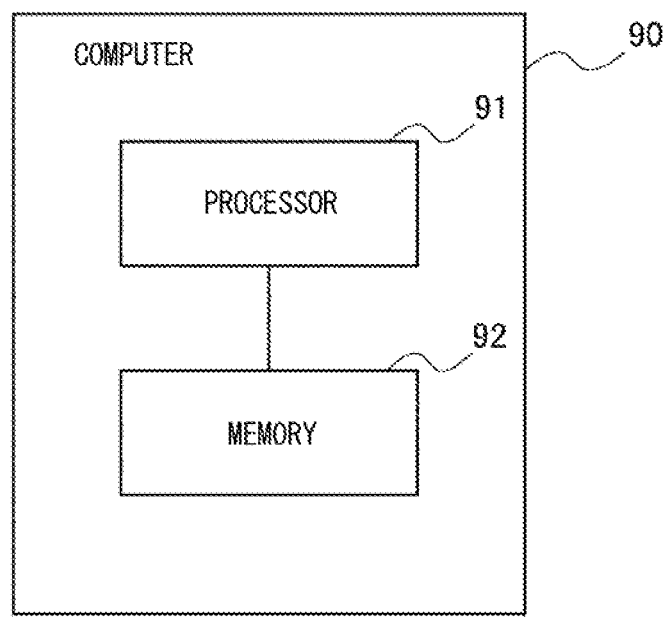
FIG. 19 is a block diagram showing a computer for executing an information processing program according to the present disclosure.

FIG. 19 is a block diagram showing the computer for executing an information processing program according to the present disclosure. As shown in FIG. 19, a computer 90 includes a processor 91 and a memory 92. The memory 92 stores the information processing program according to the present disclosure. The processor 91 reads the information processing program from the memory 92. By executing the information processing program in the processor 91, the information processing according to the present disclosure described above can be executed.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

Supplementary Note 1

An information processing apparatus comprising:
an event index generation unit configured to generate an event index using event information output from a terminal; and
a search condition generation unit configured to generate a search condition for extracting the terminal exhibiting a specific behavior using a dynamic analysis result generated based on events occured during an operation of malware and the event index, wherein
the search condition generation unit is configured to generate the search condition by reflecting an occurrence tendency of the event included in the dynamic analysis result in the terminal.

Supplementary Note 2

The information processing apparatus according to Supplementary note 1, wherein
the search condition generation unit is configured to generate the search condition by reflecting a process behavior of the event included in the dynamic analysis result in the terminal.

Supplementary Note 3

The information processing apparatus according to Supplementary note 1 or 2, wherein
the search condition generation unit is configured to determine whether or not a target event is a rare event based on the event index, and
when the target event is the rare event, the search condition generation unit is configured to generate the search condition in such a way that a search range becomes wider than a search range corresponding to the rare event.

Supplementary Note 4

The information processing apparatus according to Supplementary note 3, wherein
when the target event is the rare event, the search condition generation unit is configured to add a rare flag indicating that the target event is the rare event to the search condition.

Supplementary Note 5

The information processing apparatus according to Supplementary note 3 or 4, wherein
when the target event is the rare event, the search range is widened by setting a file path higher than a file path of the executable file of the rare event.

Supplementary Note 6

The information processing apparatus according to any one of Supplementary notes 1 to 5, wherein
the search condition generation unit is configured to determine whether or not a target event is a frequent event based on the event index, and
when the target event is a frequent event, the search condition generation unit is configured to exclude the search condition corresponding to the frequent event to generate the search condition.

Supplementary Note 7

The information processing apparatus according to any one of Supplementary notes 1 to 6, further comprising
a search unit configured to search the terminal matching the search condition generated by the search condition generation unit.

Supplementary Note 8

The information processing apparatus according to Supplementary note 7, wherein
the search condition includes the rare flag indicating whether or not the event is the rare event, and
when the rare flag is true, the search unit is configured to extract the terminal included in the event index in which the number of occurrence terminals is smaller than a predetermined threshold from the event index having a lower degree of abstraction than that of the search condition.

Supplementary Note 9

The information processing apparatus according to claim 8, wherein
when the rare flag is true, the search unit is configured to determine a folder whose hierarchy is deeper than that of the search condition and in which the number of the occurrence terminals is a predetermined threshold or more as a folder to be excluded, and
the search unit is configured to exclude the folder to be excluded from the folder included in the event index.

Supplementary Note 10

The information processing apparatus according to any one of Supplementary notes 1 to 9, wherein
the search condition is configured using at least one of an event condition and a process condition, the event condition being related to at least one of process creation, thread creation, file access, registry access, dynamic library reading, and communication, and the process condition being related to an occurring process.

Supplementary Note 11

An information processing method comprising:
generating an event index using event information output from a terminal; and
generating a search condition for extracting the terminal exhibiting a specific behavior using a dynamic analysis result generated based on events occured during an operation of malware and the event index, wherein
when the search condition is generated, the search condition is generated by reflecting an occurrence tendency of the event included in the dynamic analysis result in the terminal.

Supplementary Note 12

A non-transitory computer readable medium storing a program for causing a computer to execute processing of:
generating an event index using event information output from a terminal; and
generating a search condition for extracting the terminal exhibiting a specific behavior using a dynamic analysis result generated based on events occured during an operation of malware and the event index, wherein
when the search condition is generated, the search condition is generated by reflecting an occurrence tendency of the event included in the dynamic analysis result in the terminal.

Although the present disclosure has been described with reference to the above example embodiment, the present disclosure is not limited to the configuration of the above example embodiment, and obviously includes various modifications, changes, and combinations that can be made by a person skilled in the art within the scope of the claimed disclosure.

REFERENCE SIGNS LIST

10 INFORMATION PROCESSING APPARATUS
11 EVENT INDEX GENERATION UNIT
12 SEARCH CONDITION GENERATION UNIT
13 SEARCH UNIT
15 EVENT INFORMATION STORAGE UNIT
16 EVENT INDEX STORAGE UNIT
21 DYNAMIC ANALYSIS APPARATUS
22 TERMINAL
90 COMPUTER
91 PROCESSOR
92 MEMORY

What is claimed is:

1. An information processing apparatus comprising:
a processor; and
a memory storing instructions executable by the processor to:
generate an event index using event information output from a terminal;
generate a search condition for extracting the terminal exhibiting a behavior corresponding to malware operating in the terminal, using a dynamic analysis result generated based on events that occur during operation of the malware and the event index, and
by reflecting, in the terminal, an occurrence tendency of each of the events included in the dynamic analysis result.

2. The information processing apparatus according to claim 1, wherein
the instructions are executable by the processor to generate the search condition by further reflecting, in the terminal, a process behavior of each of the events included in the dynamic analysis result.

3. The information processing apparatus according to claim 1, wherein
the instructions are executable by the processor to determine whether or not a target event is a rare event has a number of occurrence terminals satisfying a rare event threshold, based on the event index, and
the instructions are executable by the processor to, when the target event satisfies the rare event threshold, generate the search condition in such a way that a search range becomes wider than a search range corresponding to the target event.

4. The information processing apparatus according to claim 3, wherein
the instructions are executable by the processor to, when the target event satisfies the rare event threshold, add a flag indicating that the target event satisfies the rare event threshold to the search condition.

5. The information processing apparatus according to claim 3, wherein
the instructions are executable by the processor to, when the target event satisfies the rare event threshold, the search range is widened by making a file path of an executable file of the target event higher.

6. The information processing apparatus according to claim 1, wherein
the instructions are executable by the processor to determine whether or not a target event has a number of occurrence terminals satisfying a frequent event threshold, based on the event index, and the instructions are executable by the processor to, when the target event satisfies the frequent event threshold, exclude the search condition corresponding to the target event to generate the search condition.

7. The information processing apparatus according to claim 1, wherein the instructions are executable by the processor to further search the terminal matching the search condition that has been generated.

8. The information processing apparatus according to claim 7, wherein the search condition includes a flag indicating whether or not each of the events included in the dynamic analysis result has a number of occurrence terminals satisfying a rare event threshold, and the instructions are executable by the processor to, when the flag for a target event indicates that the target event satisfies the rare event threshold extract the terminal included in the event index in which the number of occurrence terminals is smaller than a predetermined threshold, from the event index having a lower degree of abstraction than that of the search condition.

9. The information processing apparatus according to claim 8, wherein the instructions are executable by the processor to, when the flag for the target event indicates that the target event satisfies the rare event threshold determine a folder having a hierarchy deeper than that of the search condition and in which the number of the occurrence terminals is the predetermined threshold or more, and the instructions are executable by the processor to exclude the determined folder from a folder included in the event index.

10. The information processing apparatus according to claim 1, wherein the search condition is configured using at least one of an event condition and a process condition, the event condition related to at least one of process creation, thread creation, file access, registry access, dynamic library reading, and communication, and the process condition related to an occurring process.

11. An information processing method performed by a processor and comprising:

generating an event index using event information output from a terminal;

generating a search condition for extracting the terminal exhibiting a behavior corresponding to malware operating in the terminal, using a dynamic analysis result generated based on events that occur during operation of the malware and the event index, and by reflecting, in the terminal, an occurrence tendency of each of the events included in the dynamic analysis result.

12. A non-transitory computer readable medium storing a program for causing a computer to execute processing comprising:

generating an event index using event information output from a terminal;

generating a search condition for extracting the terminal exhibiting a behavior corresponding to malware operating in the terminal, using a dynamic analysis result generated based on events that occur during operation of the malware and the event index, and reflecting, in the terminal, an occurrence tendency of each of the events included in the dynamic analysis result.

* * * * *